United States Patent
Torii

(10) Patent No.: US 10,168,707 B2
(45) Date of Patent: Jan. 1, 2019

(54) INFORMATION PROCESSING DEVICE, VEHICLE INFORMATION PROCESSING DEVICE, INFORMATION PROCESSING METHOD, AND VEHICLE INFORMATION PROCESSING METHOD

(71) Applicant: FUJI JUKOGYO KABUSHIKI KAISHA, Tokyo (JP)

(72) Inventor: Takeshi Torii, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 39 days.

(21) Appl. No.: 15/351,751

(22) Filed: Nov. 15, 2016

(65) Prior Publication Data

US 2017/0153643 A1    Jun. 1, 2017

(30) Foreign Application Priority Data

Nov. 27, 2015   (JP) .................................. 2015-231941

(51) Int. Cl.
| | |
|---|---|
| G01C 22/00 | (2006.01) |
| G05D 1/00 | (2006.01) |
| G05D 1/02 | (2006.01) |
| G01C 21/34 | (2006.01) |

(Continued)

(52) U.S. Cl.
CPC ........... G05D 1/0212 (2013.01); B60W 30/00 (2013.01); G01C 21/3415 (2013.01); G01C 21/3453 (2013.01); G01C 21/3492 (2013.01); G01C 21/3605 (2013.01); G01C 21/3691 (2013.01); G05D 1/0022 (2013.01)

(58) Field of Classification Search
None
See application file for complete search history.

(56) References Cited

U.S. PATENT DOCUMENTS

| 6,591,172 B2 * | 7/2003 | Oda ....................... G05D 1/027 |
| | | 701/23 |
| 9,188,985 B1 * | 11/2015 | Hobbs ................... G01C 21/34 |
| 9,483,927 B2 * | 11/2016 | Wolter .................. B60W 50/14 |

(Continued)

FOREIGN PATENT DOCUMENTS

| JP | 2006-185158 A | 7/2006 |
| JP | 2015-141050 A | 8/2006 |

(Continued)

OTHER PUBLICATIONS

Office Action received for Japanese Patent application No. 2015-231941, dated Aug. 1, 2017, 3 pages of office action and 4 pages of English translation.

(Continued)

*Primary Examiner* — Bhavesh V Amin
(74) *Attorney, Agent, or Firm* — Chip Law Group

(57) ABSTRACT

An information processing device includes circuitry configured to: acquire, from vehicles each of which has a driving assist function, a use information of the driving assist function of each of the vehicles that are traveling; calculate an information indicating a use possibility of the driving assist function on the basis of the use information; and transmit the information indicating the use possibility to a given vehicle having the driving assist function in a manner that the given vehicle uses the information indicating the use possibility to conduct a route search.

22 Claims, 7 Drawing Sheets

(51) Int. Cl.
*G01C 21/36* (2006.01)
*B60W 30/00* (2006.01)

(56) References Cited

U.S. PATENT DOCUMENTS

| | | | | |
|---|---|---|---|---|
| 9,528,850 B1* | 12/2016 | Hobbs | ............... | G01C 21/34 |
| 9,581,460 B1* | 2/2017 | McNew | ............. | G01C 21/3667 |
| 9,672,719 B1* | 6/2017 | Hollenstain | ............ | G08B 21/18 |
| 9,720,415 B2* | 8/2017 | Levinson | ............. | G05D 1/0214 |
| 9,721,468 B2* | 8/2017 | Giesler | ............ | G08G 1/096725 |
| 9,767,516 B1* | 9/2017 | Konrardy | ............... | G06Q 40/08 |
| 9,796,388 B2* | 10/2017 | Tseng | ................. | B60W 30/182 |
| 9,805,423 B1* | 10/2017 | Konrardy | ............... | G06Q 40/08 |
| 2006/0161341 A1* | 7/2006 | Haegebarth | ............. | G08G 1/20 |
| | | | | 701/117 |
| 2007/0050191 A1* | 3/2007 | Weider | ............. | G06F 17/30864 |
| | | | | 704/275 |
| 2010/0256836 A1* | 10/2010 | Mudalige | ............. | G08G 1/163 |
| | | | | 701/2 |
| 2012/0179365 A1* | 7/2012 | Miyahara | ........... | G01C 21/3469 |
| | | | | 701/428 |
| 2015/0066282 A1* | 3/2015 | Yopp | ................... | G05D 1/0061 |
| | | | | 701/24 |
| 2015/0066284 A1* | 3/2015 | Yopp | ................... | B60W 30/00 |
| | | | | 701/29.2 |
| 2015/0148985 A1* | 5/2015 | Jo | .................... | G08G 1/096725 |
| | | | | 701/1 |
| 2015/0179062 A1* | 6/2015 | Ralston | .................. | G01C 21/26 |
| | | | | 701/117 |
| 2015/0346718 A1* | 12/2015 | Stenneth | ............ | G06Q 30/0611 |
| | | | | 701/2 |
| 2016/0305787 A1* | 10/2016 | Sato | ..................... | G05D 1/0088 |
| 2017/0153643 A1* | 6/2017 | Torii | .................. | G01C 21/3415 |

FOREIGN PATENT DOCUMENTS

| | | |
|---|---|---|
| JP | 2015-141050 A | 8/2015 |
| JP | 2015-184110 A | 10/2015 |

OTHER PUBLICATIONS

Office Action for JP Patent Application No. 2015-231941, dated Feb. 13, 2018, 04 pages of Office Action and 04 pages of English Translation.

* cited by examiner

FIG.5

| ROUTE | SECTION | TYPE | (a) AVERAGE CONTINUOUS USE RATE | (b) DISTANCE (km) | (c) ESTIMATED DRIVING TIME (min) | (d) TIME RATIO | (e) USE POSSIBILITY RATE ((a) × (d) × (f)) | (f) CORRECTION COEFFICIENT |
|---|---|---|---|---|---|---|---|---|
| A | (1) | LOCAL ROAD (NARROW ROAD HAVING SINGLE LANE) | 30% | 15 | 23 | 0.21 | 6.3 | |
| | (2) | INTERURBAN HIGHWAY | 60% | 45 | 34 | 0.31 | 18.6 | |
| | (3) | LOCAL ROAD (ROAD HAVING HEAVY TRAFFIC) | 20% | 35 | 53 | 0.48 | 6.7 | 0.9 |
| | TOTAL | — | | 95 | 109 | 1.00 | 31.6 | |

FIG.6

| ROUTE | SECTION | TYPE | (a) AVERAGE CONTINUOUS USE RATE | (b) DISTANCE (km) | (c) ESTIMATED DRIVING TIME (min) | (d) TIME RATIO | (e) USE POSSIBILITY RATE ((a) × (d) × (f)) | (f) CORRECTION COEFFICIENT |
|---|---|---|---|---|---|---|---|---|
| B | (4) | LOCAL ROAD (NARROW ROAD HAVING SINGLE LANE) | 20% | 3 | 5 | 0.04 | 0.8 | |
| | (5) | URBAN HIGHWAY | 50% | 40 | 40 | 0.37 | 14.8 | 0.8 |
| | (6) | INTERURBAN HIGHWAY | 80% | 45 | 34 | 0.31 | 24.8 | |
| | (7) | LOCAL ROAD (ROAD HAVING LIGHT TRAFFIC AND TWO LANES) | 40% | 20 | 30 | 0.28 | 11.1 | |
| | TOTAL | — | | 108 | 108 | 1.00 | 51.6 | |

FIG. 7

| ROUTE | SECTION | TYPE | (a) AVERAGE CONTINUOUS USE RATE | (b) DISTANCE (km) | (c) ESTIMATED DRIVING TIME (min) | (d) TIME RATIO | (e) USE POSSIBILITY RATE ((a) × (d) × (f)) | (f) CORRECTION COEFFICIENT |
|---|---|---|---|---|---|---|---|---|
| C | (8) | LOCAL ROAD (NARROW ROAD HAVING SINGLE LANE) | 20% | 3 | 5 | 0.05 | 1.0 | |
| | (9) | INTERURBAN HIGHWAY | 70% | 50 | 38 | 0.40 | 28.0 | |
| | (10) | LOCAL ROAD (ROAD HAVING HEAVY TRAFFIC) | 20% | 35 | 53 | 0.56 | 10.0 | 0.9 |
| | TOTAL | — | | 88 | 95 | 1.00 | 39.0 | |

INFORMATION PROCESSING DEVICE, VEHICLE INFORMATION PROCESSING DEVICE, INFORMATION PROCESSING METHOD, AND VEHICLE INFORMATION PROCESSING METHOD

CROSS-REFERENCE TO RELATED APPLICATIONS

The present application claims priority from Japanese Patent Application No. 2015-231941 filed on Nov. 27, 2015, the entire contents of which are hereby incorporated by reference.

BACKGROUND

1. Technical Field

The present invention relates to an information processing device, a vehicle information processing device, an information processing method, and a vehicle information processing method.

2. Related Art

For example, Japanese Unexamined Patent Application Publication (JP-A) No. 2006-185158 has described that a position information transmitter that transmits position information of a fuel cell vehicle to a center via a communication network, and a position and route information receiver that receives position and route information from the center via the communication network are included.

There are today vehicles having a driving assist function such as a preceding vehicle follow-up function of allowing the vehicles to follow preceding vehicles and a lane keeping function of allowing the vehicles to travel along lanes on the road surface. These preceding vehicle follow-up function and lane keeping function considerably depend on the road environment. Some road environment does not permit the use of these functions. For example, it is difficult to use the preceding vehicle follow-up function on roads having heavy traffic or a large number of sharp curves. It is difficult to use the lane keeping function on roads having the lanes worn out.

Meanwhile, vehicles today can obtain the optimum routes to destinations via navigation systems. Driving routes offered by the navigation systems are, however, set on the basis of the distance to destinations, the necessary time, and the like. Accordingly, once the driving routes include routes unsuitable for the use of the driving assist function, it is not possible to sufficiently use the driving assist function. There is thus the problem that drivers are unable to recognize which route allows the drivers to use the preceding vehicle follow-up function and the lane keeping function as much as possible, and to drive safe and comfortable.

The technology described in JP-A No. 2006-185158 receives position and route information from the center via the communication network, but takes nothing into consideration about the use of the driving assist function.

SUMMARY OF THE INVENTION

It is desirable to provide a novel and improved information processing device, vehicle information processing device, information processing method, and vehicle information processing method that can set a driving route on which a driving assist function can be optimally used.

An aspect of the present invention provides an information processing device including circuitry configured to: acquire, from vehicles each of which has a driving assist function, a use information of the driving assist function of each of the vehicles that are traveling; calculate an information indicating a use possibility of the driving assist function on the basis of the use information; and transmit the information indicating the use possibility to a given vehicle having the driving assist function in a manner that the given vehicle uses the information indicating the use possibility to conduct a route search.

Another aspect of the present invention provides an information processing device including circuitry configured to: acquire, from vehicles each of which has a driving assist function, a use information of the driving assist function of each of the vehicles that are traveling; calculate an information indicating a use possibility of the driving assist function on the basis of the use information; acquire a position information on a current location and a destination of a given vehicle having the driving assist function from the given vehicle; search for a driving route from the current location to the destination on the basis of the information indicating the use possibility and the position information on the current location and the destination; and transmit the driving route to the given vehicle.

The circuitry may calculate a use rate of the driving assist function as the information indicating the use possibility.

The circuitry may calculate the information indicating the use possibility on the basis of a use rate of the driving assist function and a driving time.

The circuitry may calculate the information indicating the use possibility on the basis of a correction coefficient according to an operation state of a driver with respect to the driving assist function in addition to the use rate and the driving time.

The circuitry may divide a driving route into sections including at least any one of a local road and a highway, and may calculate the information indicating the use possibility for each of the divided sections.

The circuitry may extract candidates for the driving route from the current location to the destination, and may search the candidates for a driving route having a highest use possibility of the driving assist function, on the basis of the calculated information indicating the use possibility.

Another aspect of the present invention provides a vehicle information processing device including circuitry configured to: acquire a use information of a driving assist function while a vehicle equipped with the vehicle information processing device is traveling; transmit the use information to a server; acquire, from the server, an information indicating a use possibility of the driving assist function which is calculated by the server on the basis of the use information acquired from vehicles; and search for a driving route from a current location to a destination on the basis of the information indicating the use possibility.

The circuitry may extract candidates for the driving route from the current location to the destination, and may search the candidates for a driving route having a highest use possibility of the driving assist function on the basis of the information indicating the use possibility.

Another aspect of the present invention provides a vehicle information processing device including circuitry configured to: acquire a use information of a driving assist function while a vehicle equipped with the vehicle information processing device is traveling; transmit the use information, and an information on a current location and a destination to a server; and receive, from the server, a driving route from the current location to the destination which the server searches for on the basis of the use information acquired from vehicles, and the information on the current location and the destination.

Another aspect of the present invention provides an information processing method including: acquiring, from vehicles each of which has a driving assist function, a use information of the driving assist function of each of the vehicles that are traveling; calculating an information indicating a use possibility of the driving assist function on the basis of the use information; and transmitting the information indicating the use possibility to a given vehicle having the driving assist function in a manner that the given vehicle uses the information indicating the use possibility to conduct a route search.

Another aspect of the present invention provides a vehicle information processing method including: acquiring a use information of a driving assist function while a vehicle equipped with the vehicle information processing device is traveling; transmitting the use information to a server; receiving, from the server, an information indicating a use possibility of the driving assist function which is calculated by the server on the basis of the use information acquired from vehicles; and searching for a driving route from a current location to a destination on the basis of the information indicating the use possibility.

BRIEF DESCRIPTION OF THE DRAWINGS

FIG. 5 is a schematic diagram for describing a method of calculating a use possibility rate on the basis of traveling sections accumulated in step S18 of FIG. 3 and an average continuous use rate of a driving assist function;

FIG. 6 is a schematic diagram for describing a method of calculating a use possibility rate on the basis of traveling sections accumulated in step S18 of FIG. 3 and an average continuous use rate of a driving assist function; and FIG. 7 is a schematic diagram for describing a method of calculating a use possibility rate on the basis of traveling sections accumulated in step S18 of FIG. 3 and an average continuous use rate of a driving assist function.

DETAILED DESCRIPTION

Figure 1:
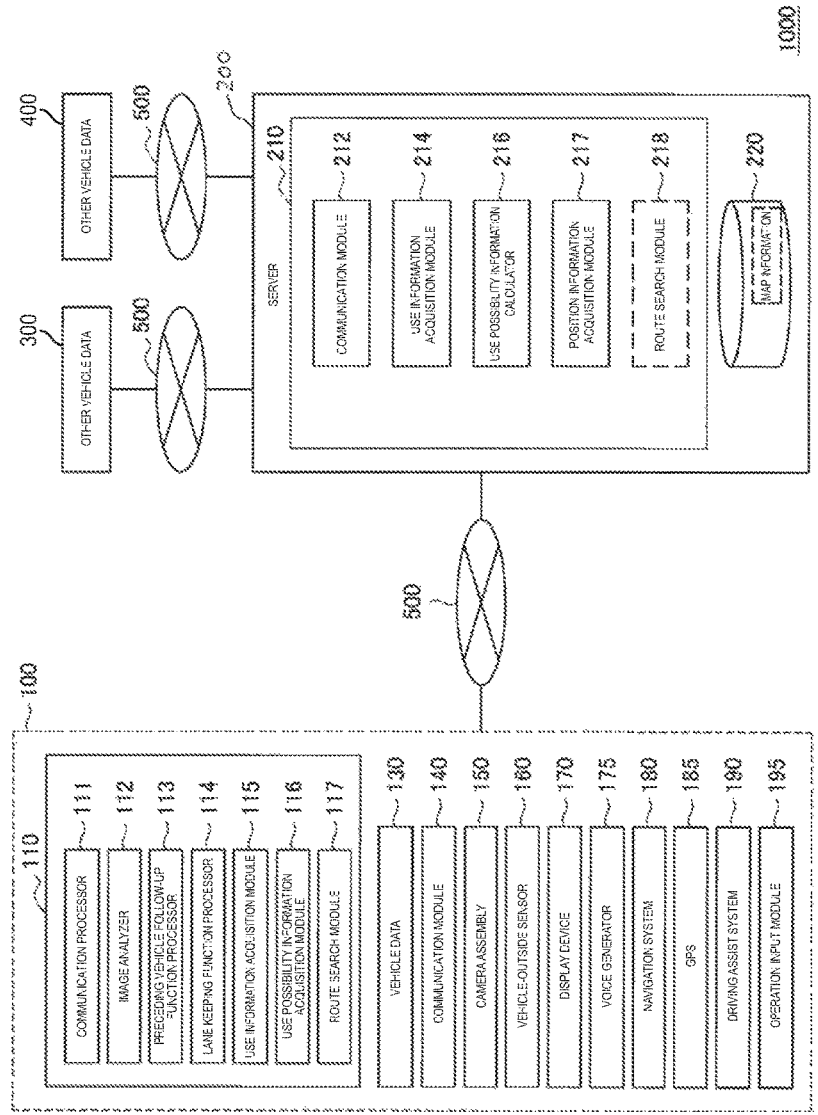
FIG. 1 is a schematic diagram illustrating a vehicle according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

First of all, the configuration of a vehicle control system 1000 according to an implementation of the present invention will be described with reference to FIG. 1. FIG. 1 is a schematic diagram for describing the configuration of the vehicle control system 1000 according to an implementation of the present invention. As illustrated in FIG. 1, a vehicle 100 is capable of communicating with a server 200 (management device) in this system 1000. The vehicle 100 is communicably coupled to the server 200, for example, via a network 500 such as the Internet, a mobile telephone network, a PHS network, a wireless LAN, WiMAX, a satellite telephone, and a beacon. For example, the vehicle 100 and the server 200 may be coupled to base stations, for example, via the mobile telephone network, the PHS network, the wireless LAN, WiMAX, the satellite telephone and the beacon, and the base stations may be coupled to each other via the network 500.

The vehicle 100 includes a controller 110, a memory 130 that stores vehicle data and the like, a communication module 140 that transmits and receives information to and from the server 200, a camera assembly 150, a vehicle-outside sensor 160, a display device 170, a voice generator 175, a navigation system 180, a GPS 185, a driving assist system 190, and an operation input module 195. The controller 110 is, for example, composed of an electronic control unit (ECU), and includes a communication processor 111 that performs processing for communication with the server 200, an image analyzer 112 that analyzes the position of a lane and the distance to a preceding vehicle on the basis of image information obtained by the camera assembly 150 capturing an image, a preceding vehicle follow-up function processor 113 that performs processing for allowing the vehicle 100 to follow a preceding vehicle, a lane keeping function processor 114 that performs processing for the lane keeping function, a use information acquisition module 115 that acquires use information of the driving assist function of the vehicle 100, a use possibility information acquisition module 116 that acquires information indicating the use possibility of the driving assist function from the server 200, and a route search module 117. Each component of the controller 110 can be configured with a central processing unit such as a CPU, and a program (software) that causes the component to function.

The camera assembly 150 included in the vehicle 100 images the vehicle outside, and acquires image information of the vehicle outside (image information, in particular, of the road surfaces in front of the vehicle 100, lanes indicating driving lanes, preceding vehicles, traffic lights, and various traffic signs). More preferably, the camera assembly 150 should include a stereo camera. In this case, the camera assembly 150 includes a symmetrical pair of cameras each equipped with an image sensor such as a CCD sensor and a CMOS sensor, images the outside environment of the vehicle 100, and sends the captured image information to the image analyzer 112 of the controller 110.

Based on the principle of triangulation, the image analyzer 112 can generate and acquire distance information on the distance to a target object (such as a preceding vehicle) from the disparities of the corresponding positions in a symmetrical pair of images obtained by the symmetrical pairs of cameras of the camera assembly 150 imaging the areas in the vehicle traveling direction. In addition, the image analyzer 112 can detect three-dimensional object data, lane line data, and the like by performing well-known grouping processing on the distance information generated on the basis of the principle of triangulation, and then comparing the distance information subjected to the grouping processing with preset three-dimensional object data and the like. This also allows the image analyzer 112 to recognize lanes indicating driving lanes, stop signs, stop lines, ETC gates, and the like.

Further, using distance information on the distance (inter-vehicle distance L) between a preceding vehicle and the vehicle 100 which is generated on the basis of the principle of triangulation, the image analyzer 112 can calculate the change amount of the inter-vehicle distance L and relative velocity V to the preceding vehicle. The change amount of the inter-vehicle distance L can be obtained by integrating the inter-vehicle distance L between frame images detected every unit time. The relative velocity V can be obtained by dividing the inter-vehicle distance detected every unit time by the unit time.

The vehicle-outside sensor 160 includes a radar sensor, a temperature sensor and the like, and acquires vehicle-outside environment information. The display device 170 is disposed close to the instrument panel of the vehicle 100, and displays map information acquired from the navigation system 180 while superimposing, for example, the current position and driving routes to the destination acquired by the GPS 185 on the map information. In addition, the display device 170 displays various kinds of information acquired from the server 200. The voice generator 175 articulates the voice and warning information of the navigation system 180. The navigation system 180 has map information, searches for a driving route to the destination, and causes the display device 170 to display the driving route along with the map information. In addition, the navigation system 180 calculates the distance from the current location to the destination, the necessary time, the toll of the highway, and the like on the basis of the map information, and causes the display device 170 to display the distance, the necessary time, the toll, and the like. The GPS 185 acquires information on the current position. The information on the current position which is acquired by the GPS 185 is sent from the communication module 140 to the server 200.

The operation input module 195 receives operation information input by a driver. For example, the operation input module 195 receives operation information for setting the driving assist function in a manner that the driving assist function is used, velocity information for using the preceding vehicle follow-up function, inter-vehicle distance information on the distance to a preceding vehicle, position information of a destination, and the like. The operation information by a driver is sent from the communication module 140 to the server 200.

The vehicle 100 according to the present implementation, and vehicles 300, 400 . . . according to the present implementation each has a function of the driving assist such as the preceding vehicle follow-up function (which will also be referred to as follow-up function) and the lane keeping function based on image information detected by the camera assembly 150. The follow-up function is a function of detecting the distance to a preceding vehicle, and allowing the vehicle to travel so as to keep a predetermined distance to the preceding vehicle. The lane keeping function is a function of detecting a lane (such as a lane line) on a road, and allowing the vehicle 100 to travel along the lane, and includes a function of notifying the driver of information indicating whether or not the vehicle 100 is traveling along the lane. The lane keeping function further includes a function of allowing the vehicle 100 to travel along the lane, for example, in accordance with either one of steering control and rear-wheel torque vectoring control. The present specification generically refers to a function of assisting a driver to drive such as the preceding vehicle follow-up function and the lane keeping function as driving assist function.

The driving assist system 190 is a component that performs the driving assist function. The driving assist system 190 assists a driver to drive in accordance with the control of the preceding vehicle follow-up function processor 113 and the lane keeping function processor 114 of the controller 110. If the vehicle 100 is made to follow a preceding vehicle, the preceding vehicle follow-up function processor 113 acquires the inter-vehicle distance L to the preceding vehicle from the image analyzer 112, controls the engine and motors that drive the vehicle 100, in a manner that the inter-vehicle distance L is kept constant, and controls the brakes of the vehicle 100. Meanwhile, if the vehicle 100 is made to travel along a lane, the lane keeping function processor 114 acquires information on the position of the lane from the image analyzer 112, and performs steering device control and rear-wheel motor torque vectoring control in a manner that the vehicle 100 travels along the lane. In addition, the lane keeping function processor 114 acquires information on the position of the lane in front of the vehicle from the image analyzer 112. If the vehicle 100 deviates from the lane, the lane keeping function processor 114 causes the display device 170 to display warning, and causes the voice generator 175 to generate a warning sound. These preceding vehicle follow-up function and lane keeping function can be performed by using existing technology.

The use information acquisition module 115 of the controller 110 acquires use information on the use state of the driving assist function. Specifically, the use information acquisition module 115 acquires the use rate of the driving assist function. This use information is transmitted from the communication module 140 to the server 200 through the processing of the communication processor 111.

The server 200 is coupled to the other vehicles 300, 400 . . . like the vehicle 100. The other vehicles 300, 400 . . . each have a similar configuration to that of the vehicle 100. That is to say, the server 200 is coupled to vehicles having a driving assist function system. The server 200 includes a controller 210 and a database 220. The controller 210 can be configured with a central processing unit such as a CPU, and a program (software) that causes the controller 210 to function. The controller 210 includes a communication module 212 that transmits and receives information to and from the vehicles 100, 300, 400 . . . , a use information acquisition module 214 that acquires, from the vehicles 100, 300, 400 . . . each of which has the driving assist function, use information of the driving assist function of each of the vehicles 100, 300, 400 . . . that are traveling, an use possibility information calculator 216 that calculates information indicating the use possibility of the driving assist function on the basis of the use information of the assist function, and a position information acquisition module 217 that acquires position information on the current location and the destination which is sent from the vehicles 100, 300, 400 . . . .

As discussed above, the driving assist function such as the follow-up function and the lane keeping function considerably depends on road environments. If the navigation system 180 searches for the shortest route to a destination, and a narrow road and a road on which a lane is not drawn in a manner that the lane can be sufficiently recognized are selected as a route, the driving assist function is unavailable and these functions are no longer performed sufficiently.

In the present implementation, based on the continuous use rate of the follow-up function, the continuous use rate of the lane keeping function, the temporary stop rate (HALT), and the like, the route to be taken on which the follow-up function and the lane keeping function can be used the most is presented to a driver as a recommended route of the navigation system 180. Accordingly, the use rate (average continuous use rate) of the driving assist function is calculated for each fixed section on the basis of use information of the driving assist function acquired from each vehicle, the use possibility rate for each route is obtained on the basis of a result obtained by searching for the routes from a spot to another spot, and the use rate and the use possibility rate are reflected on the route search result. The use possibility rate is information indicating the possibility that the driving assist function is used, which is calculated for each fixed section. The use possibility rate may be calculated from much data including other vehicles, or the driving history of the vehicle 100. If both the data including other vehicles and the driving history of the vehicle 100 are used, it is preferable to place a heavier weight on the driving history of the vehicle 100. A driver can move less tired and more comfortable by using the driving assist function as much as possible.

Figure 2:
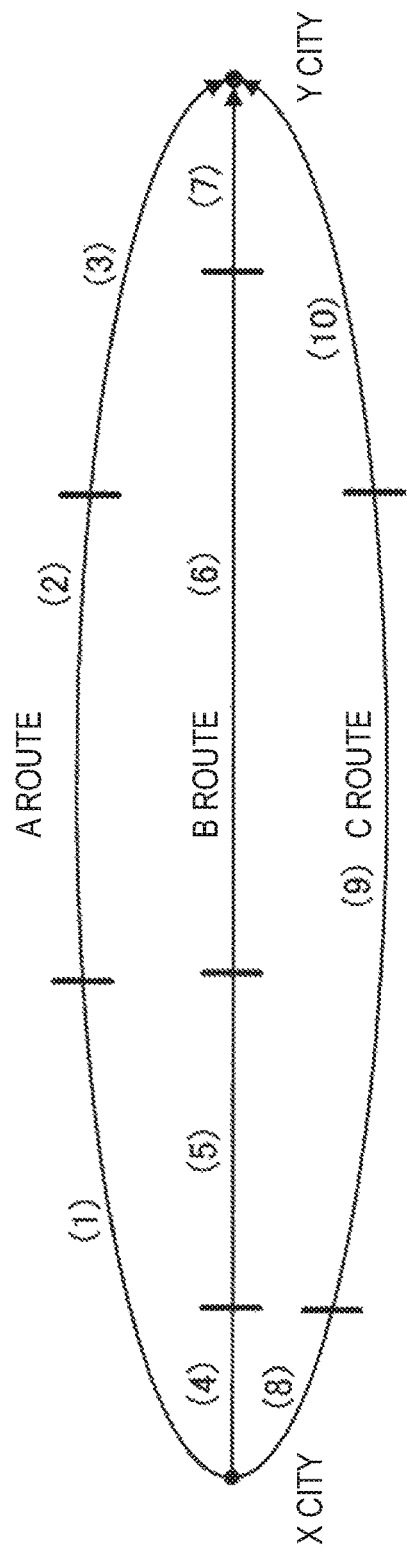
FIG. 2 is a schematic diagram illustrating that a navigation system searches for three routes of A route, B route, and C route from X city (current location) to Y city (destination)

The following describes an example in which, as illustrated in FIG. 2, the navigation system 180 searches for the three routes of A route, B route, and C route from X city (current location) to Y city (destination). Although the typical navigation system searches for the optimum route on the basis of the driving distance, the necessary time, the toll of the highway, and the like, the system 1000 according to the present implementation searches for the optimum route on the basis of information indicating the use possibility of the driving assist function.

Figure 3:
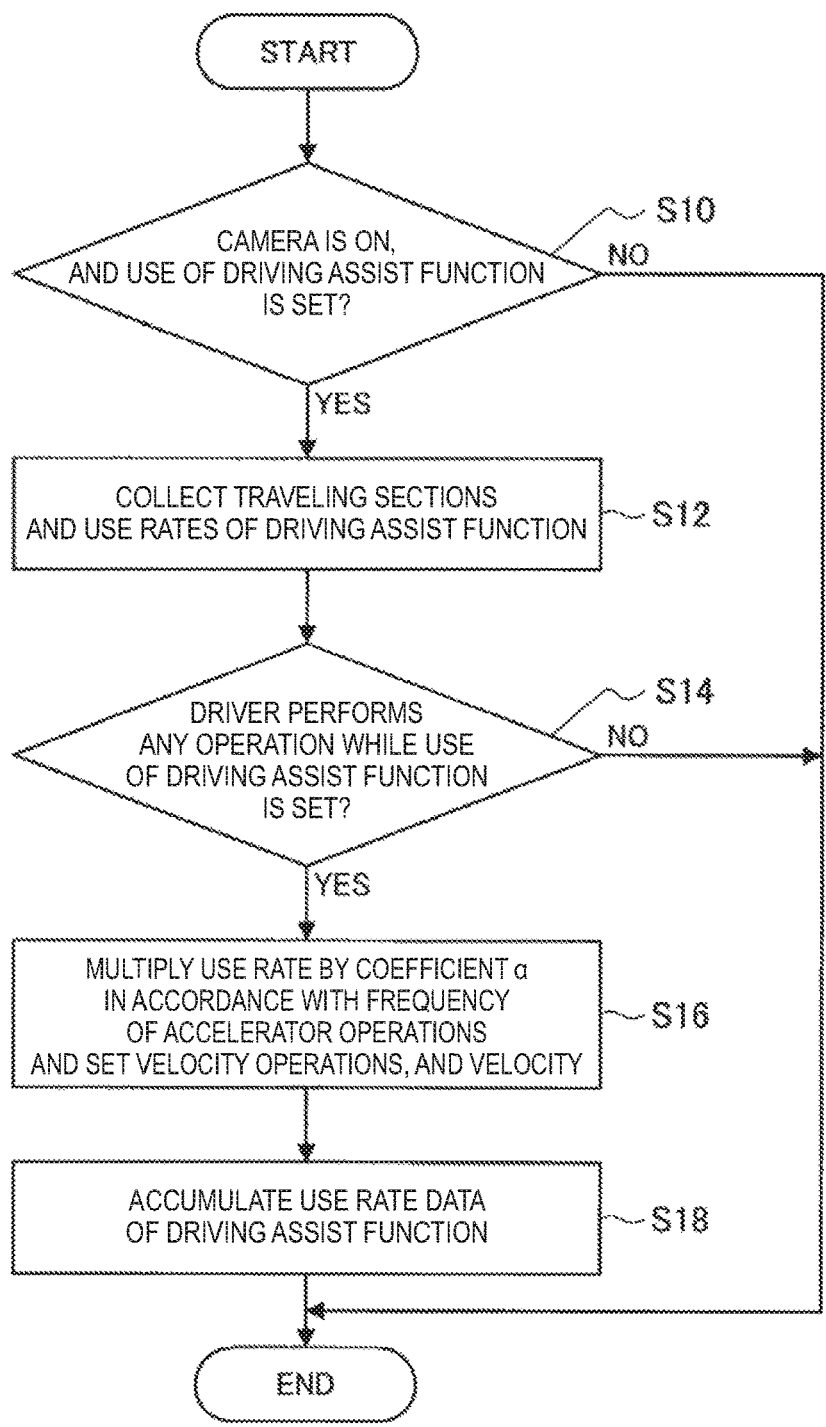
FIG. 3 is a flowchart illustrating processing performed by a server.

FIG. 3 is a flowchart illustrating processing performed by the server 200, and illustrates processing for the server 200 to obtain the use rate of the driving assist function for each route (for each fixed section), and to accumulate the use rates in the database 220.

First of all, in step S10, it is determined whether or not the camera assembly 150 of each of the vehicles 100, 300, 400 . . . coupled to the server 200 is powered on, and the driving assist function based on image information from the camera assembly 150 is set in a manner that the driving assist function is used. Next, in step S12, the traveling sections of the respective vehicles 100, 300, 400 . . . , and the use rates of the driving assist function are collected. As an example, the use rate is the ratio of the time for which either one of the preceding vehicle follow-up function and the lane keeping function is continuously set to the time elapsed until either one of the set preceding vehicle follow-up function and the set lane keeping function is released. The average continuous use rate for each fixed section is then obtained by acquiring the use rates from vehicles for each fixed section. The average continuous use rate is the average value of the ratios of the time for which either one of the preceding vehicle follow-up function and the lane keeping function is continuously set to the time elapsed until either one of the set preceding vehicle follow-up function and the set lane keeping function is released. The 50th percentile of the continuous use rates of vehicles that have traveled through a certain section may be used instead of the average value.

A driver changes the set velocity of the follow-up function, and the set inter-vehicle distance to a preceding vehicle in some cases by performing an accelerator operation and an operation from the operation input module 195 while driving with the driving assist function. If there is such an operation, the use rate of the driving assist function lowers. Accordingly, in step S14, it is determined whether or not the driver performs an operation while the use of the driving assist function is set. If the driver performs an operation, the flow proceeds to step S16.

In step S16, a correction coefficient $\alpha$ is obtained in accordance with the frequency of accelerator operations of the driver and operations of changing the set velocity which are performed while the use of the driving assist function is set, and the coefficient $\alpha$ is multiplied by the average continuous use rate. As a method of calculating the correction coefficient $\alpha$, for example, if there are ten or more pieces of data in which the set velocity is changed ten or more times in a fixed section, the use rate is multiplied by 0.8 ($\alpha=0.8$). Meanwhile, for example, if there are ten or more pieces of data in which accelerator operations are performed twenty or more times in a fixed section the use rate is multiplied by 0.9. This makes it possible to lower the recommendation degree irrespective of the continuously set driving assist function if the driver performs a large number of operations.

When the use rate data are accumulated, the correction coefficient $\alpha$ may be multiplied by the average continuous use rate. Alternatively, when the recommended route is calculated, the correction coefficient $\alpha$ may be multiplied. Following step S16, the flow proceeds to step S18. The average continuous use rate data of the driving assist function are accumulated in the database 220.

Figure 4:
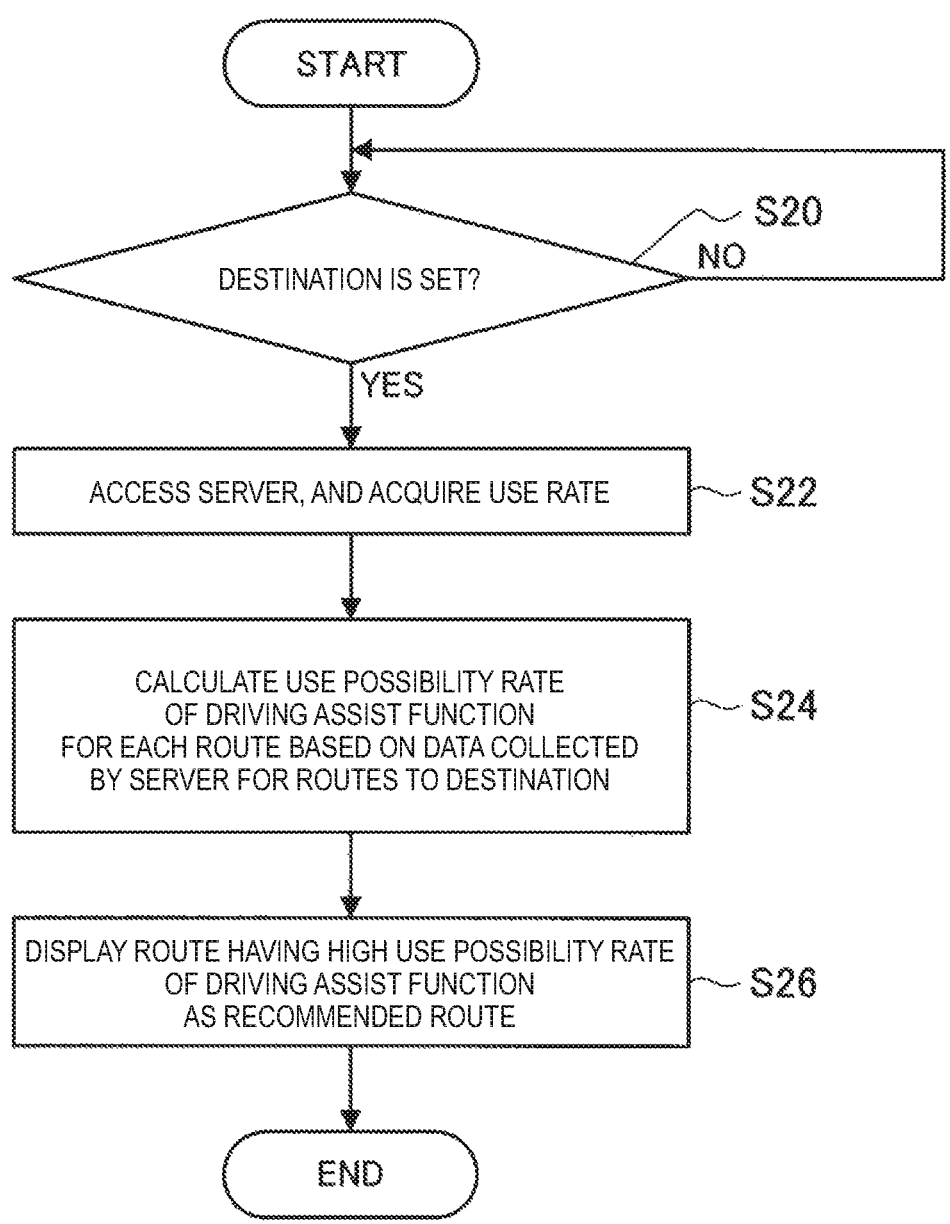
FIG. 4 is a flowchart illustrating processing performed by a vehicle control device.

FIG. 4 is a flowchart illustrating processing performed by the controller 110 of the vehicle 100. The controller 110 of the vehicle 100 transmits use information to the server 200, receives information indicating the use possibility of the driving assist function from the server 200, and conducts a route search on the basis of the information indicating the use possibility. First of all, in step S20, it is determined whether or not a driver sets a destination in the navigation system 180. The flow proceeds to step S22 if a destination is set. Meanwhile, if a destination is not set, the flow waits in step S20.

In step S22, the server 200 that accumulates the use rate data of the driving assist function of the vehicles 100, 300, 400 . . . is accessed, and the information on the use possibility of the driving assist function is acquired from the server 200. More specifically, the average continuous use rate of the driving assist function for each traveling section accumulated in the database 220 in step S18 of FIG. 3 is acquired. Next, in step S24, the use possibility rate of the driving assist function for each route is calculated on the basis of the average continuous use rate of the driving assist function collected from the server 200 for routes to the destination which are presented by the navigation system 180.

Next, in step S26, a route having a higher use possibility rate of the driving assist function is displayed on the display device 170 as a recommended route.

Each of FIGS. 5 to 7 is a schematic diagram for describing a method of calculating the use possibility rate on the basis of traveling sections accumulated in step S18 of FIG. 3 and the average continuous use rate of the driving assist function. FIGS. 5 to 7 illustrate an example in which the use possibility rate is calculated when the navigation system 180 presents the three routes of A route, B route, and C route as illustrated in FIG. 2. Additionally, the routes may be sectioned in more detail.

As illustrated in FIG. 5, A route has a section (1) representing a local road (a narrow road having a single lane), a section (2) representing an interurban highway, and a section (3) representing a local road (a road having heavy traffic). The average continuous use rate of the driving assist function for the section (1) is 30%, The average continuous use rate of the driving assist function for the section (2) is 60%, and the average continuous use rate of the driving assist function for the section (3) is 20%.

The sections (1), (2), and (3) respectively have distances of 15 km, 45 km, and 35 km. The estimated driving time (minutes) for each section is obtained from the estimated vehicle velocity for the section. For example, the estimated vehicle velocity can be set as 40 km/h in a local road, 80 km/h in an interurban highway, and 60 km/h in an urban highway. As the estimated driving time, data may be used which are actually collected from vehicles.

The estimated driving time for the section (1) is 23 minutes, the estimated driving time for the section (2) is 34 minutes, and the estimated driving time for the section (3) is 53 minutes. The time ratio for each section is obtained from the estimated driving time. The section (1) has a time ratio of 0.21, the section (2) has a time ratio of 0.31, and the section (3) has a time ratio of 0.48.

The use possibility rate is calculated from the following expression. The correction coefficient α typically has a value of 1.0. However, for example, the driving assist function is used less frequently in sections having heavy traffic, and thus a value less than or equal to 1 (approximately 0.8 to 0.9) is set as the correction coefficient α as discussed above.

use possibility rate=average continuous use rate×time ratio×correction coefficient As described above, once the use possibility rate is obtained for each of the sections (1), (2), and (3) of A route, the total use possibility rate for A route (=31.6) is obtained. Similarly, the use possibility rates are obtained for B route and C route, which serves as a reference for route selection. B route has a total use possibility rate of 51.6 as illustrated in FIG. 6, while C route has a total use possibility rate of 39.0 as illustrated in FIG. 7.

In FIGS. 5 to 7, if distance and time are prioritized, C route has the shortest distance and the shortest estimated driving time. Accordingly, C route is displayed on the top when a search result is displayed. If tolls are prioritized, the highway of A route has the shortest driving distance. According, A route is displayed on the top. The typical navigation system selects a route by taking into consideration the distance to a destination, the time, and the toll.

Meanwhile, in the present implementation, a route is selected on the basis of the use possibility rate of the driving assist function. As an example, (a) average continuous use rate and (f) correction coefficient illustrated in FIGS. 5 to 7 are calculated by the use possibility information calculator 216 of the controller 210 of the server 200, and the other information is calculated by the navigation system 180 of the vehicle 100. The communication module 212 of the server 200 sends (a) average continuous use rate and (f) correction coefficient to the vehicle 100.

In this case, the use possibility information acquisition module 116 of the controller 110 of the vehicle 100 acquires (a) average continuous use rate and (f) correction coefficient from the server 200 as information indicating the use possibility. The route search module 117 of the controller 110 searches the candidate routes (A route, B route, and C route) acquired from the navigation system 180 for a driving route on the basis of the use possibility rate. Specifically, the route search module 117 multiplies (d) time ratio acquired from the navigation system 180 by (a) average continuous use rate and (f) correction coefficient received from the server 200 to calculate the use possibility rate, and outputs the driving route having the highest calculated use possibility rate as a search result. The output search result is displayed by the display device 170. Additionally, (d) time ratio is the ratio of (c) estimated driving time for each section, and can be calculated by the navigation system 180.

Meanwhile, the server 200 may calculate up to the use possibility rate of (e). In this case, the server 200 has the use possibility information calculator 216 multiply (a) average continuous use rate by (d) time ratio and (f) correction coefficient on the basis of position information of the current location and the destination, thereby calculating (e) use possibility rate. The use possibility information acquisition module 116 of the controller 110 acquires the use possibility rate of (e) from the server 200 as information indicating the use possibility. The route search module 117 outputs, as a search result, the driving route having the highest use possibility rate among the candidate routes (A route, B route, and C route) acquired from the navigation system 180 on the basis of the use possibility rate of (e) acquired by the use possibility information acquisition module 116.

In this way, in the present implementation, if the use of the driving assist function is prioritized, a route can be selected. In FIGS. 5 to 7, it is B route that has the highest total use possibility rate. The route search module 117 of the controller 110 thus extracts B route on the top as a search result if a driver conducts a route search by prioritizing the use of the driving assist function. If B route is selected, the driving assist function can be used the most until the destination is reached. Using the driving assist function more thus can reduce the tiredness of a driver and allow the driver to move comfortable.

In the above-described example, the use possibility information acquisition module 116 of the vehicle 100 acquires information (use possibility rate) indicating the use possibility from the server 200, and the route search module 117 conducts a route search. However, the server 200 can also conduct up to a route search collectively. In this case, as illustrated in FIG. 1, the controller 210 of the server 200 further includes a route search module 218. Map information is stored in the database 220 of the server 200. The route search module 218 first extracts routes similarly to the navigation system 180 on the basis of position information on the current location and the destination acquired by the position information acquisition module 217. The route search module 218 then searches routes for the driving route having the highest use possibility rate on the basis of the information (use possibility rate) indicating the use possibility which is calculated by the use possibility information calculator 216. The communication module 212 transmits the driving route that is searched for by the route search module 218 to the vehicle 100. Receiving the driving route that is searched for by the route search module 218, the controller 110 of the vehicle 100 causes the display device 170 to display a search result. Such a configuration allows the server 200 to conduct up to a route search collectively, and it is thus possible to further simplify the processing of the vehicle 100.

According to the present implementation as described above, it is possible to search for the driving route on which the driving assist function can be used the most on the basis of information indicating the use possibility of the driving assist function because the information indicating the use possibility of the driving assist function is calculated by the server 200 on the basis of use information of the driving assist function of the vehicles 100, 300, 400 . . . . This allows a driver to drive less tired and more comfortable by using the driving assist function as much as possible.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

According to an implementation of the present invention as described above, it is possible to set a driving route on which a driving assist function can be optimally used.

The invention claimed is:
1. An information processing device, comprising:
circuitry configured to:
  acquire, from vehicles each of which has a driving assist function, use information of the driving assist function of each of the vehicles that are traveling;
  calculate information indicating a use possibility of the driving assist function on the basis of the use information and a correction coefficient, wherein the correction coefficient is based on a driver operation state with respect to the driving assist function; and
  transmit the information indicating the use possibility to a target vehicle of the vehicles, wherein the target vehicle uses the information indicating the use possibility to conduct a route search.

2. An information processing device, comprising:
circuitry configured to:
  acquire, from vehicles each of which has a driving assist function, use information of the driving assist function of each of the vehicles that are traveling;
  calculate information indicating a use possibility of the driving assist function on the basis of the use information and a correction coefficient, wherein the correction coefficient is based on a driver operation state with respect to the driving assist function;
  acquire, from a target vehicle of the vehicles, position information on a current location and a destination of the target vehicle;
  search for a driving route from the current location to the destination on the basis of the information indicating the use possibility and the position information on the current location and the destination; and
  transmit the driving route to the target vehicle.

3. The information processing device according to claim 1, wherein the circuitry:
  calculates a use rate of the driving assist function; and
  calculates the information indicating the use possibility based on the use rate.

4. The information processing device according to claim 2, wherein the circuitry:
  calculates a use rate of the driving assist function; and
  calculate the information indicating the use possibility based on the use rate.

5. The information processing device according to claim 1, wherein the circuitry calculates the information indicating the use possibility on the basis of a use rate of the driving assist function and a driving time.

6. The information processing device according to claim 2, wherein the circuitry calculates the information indicating the use possibility on the basis of a use rate of the driving assist function and a driving time.

7. The information processing device according to claim 1, wherein the circuitry divides a driving route into sections including at least any one of a local road and a highway, and calculates the information indicating the use possibility for each of the divided sections.

8. The information processing device according to claim 2, wherein the circuitry divides the driving route into sections including at least anyone of a local road and a highway, and calculates the information indicating the use possibility for each of the divided sections.

9. The information processing device according to claim 3, wherein the circuitry divides a driving route into sections including at least any one of a local road and a highway, and calculates the information indicating the use possibility for each of the divided sections.

10. The information processing device according to claim 4, wherein the circuitry divides the driving route into sections including at least anyone of a local road and a highway, and calculates the information indicating the use possibility for each of the divided sections.

11. The information processing device according to claim 5, wherein the circuitry divides a driving route into sections including at least any one of a local road and a highway, and calculates the information indicating the use possibility for each of the divided sections.

12. The information processing device according to claim 6, wherein the circuitry divides the driving route into sections including at least any one of a local road and a highway, and calculates the information indicating the use possibility for each of the divided sections.

13. The information processing device according to claim 2, wherein the circuitry
  extracts candidates for the driving route from the current location to the destination, and
  searches the candidates for the driving route having a highest use possibility of the driving assist function, on the basis of the calculated information indicating the use possibility.

14. A vehicle information processing device, comprising:
circuitry configured to:
  acquire use information of a driving assist function while a first vehicle equipped with the vehicle information processing device is traveling;
  transmit the use information to a server;
  acquire, from the server, information indicating a use possibility of the driving assist function which is calculated by the server on the basis of the use information acquired from vehicles and a correction coefficient, wherein the correction coefficient is based on a driver operation state with respect to the driving assist function; and
  search for a driving route from a current location to a destination on the basis of the information indicating the use possibility.

15. The information processing device according to claim 6, wherein the circuitry
  extracts candidates for the driving route from the current location to the destination, and
  searches the candidates for the driving route having a highest use possibility of the driving assist function on the basis of the information indicating the use possibility.

16. A vehicle information processing device, comprising:
circuitry configured to:
  acquire use information of a driving assist function while a first vehicle equipped with the vehicle information processing device is traveling;
  transmit the use information, and information on a current location and a destination to a server; and
  receive, from the server, a driving route from the current location to the destination which the server searches for on the basis of the use information acquired from vehicles, the information on the current location and the destination, and a correction coefficient, wherein the correction coefficient is based on a driver operation state with respect to the driving assist function.

17. An information processing method, comprising:
acquiring, from vehicles each of which has a driving assist function, use information of the driving assist function of each of the vehicles that are traveling;
calculating information indicating a use possibility of the driving assist function on the basis of the use information and a correction coefficient, wherein the correction coefficient is based on a driver operation state with respect to the driving assist function; and
transmitting the information indicating the use possibility to a target vehicle of the vehicles, wherein the target vehicle uses the information indicating the use possibility to conduct a route search.

18. A vehicle information processing method, comprising:
acquiring use information of a driving assist function while a first vehicle equipped with a vehicle information processing device is traveling;
transmitting the use information to a server;
receiving, from the server, information indicating a use possibility of the driving assist function which is calculated by the server on the basis of the use information acquired from vehicles and a correction coefficient, wherein the correction coefficient is based on a driver operation state with respect to the driving assist function; and
searching for a driving route from a current location to a destination on the basis of the information indicating the use possibility.

19. The information processing device according to claim 1, wherein the driver operation state corresponds to a frequency of accelerator operations on the target vehicle.

20. The information processing device according to claim 5, wherein the information indicating the use possibility corresponds to a product of the use rate of the driving assist function and a time ratio calculated based on the driving time.

21. The information processing device according to claim 5, wherein the information indicating the use possibility corresponds to a product of the use rate of the driving assist function, a time ratio calculated based on the driving time, and the correction coefficient.

22. The vehicle information processing device according to claim 14, wherein the circuitry is further configured to output the driving route that corresponds to a route with a highest use possibility among a plurality of routes from the current location to the destination.

* * * * *